United States Patent
Fabris et al.

(10) Patent No.: US 11,712,681 B2
(45) Date of Patent: Aug. 1, 2023

(54) NEAR INFRARED PHOTOCATALYST BASED ON TIO$_2$-COATED GOLD NANOPARTICLES

(71) Applicant: Rutgers, The State University of New Jersey, New Brunswick, NJ (US)

(72) Inventors: Laura Fabris, Somerset, NJ (US); Fuat E. Celik, Princeton, NJ (US); Supriya Atta, New Brunswick, NJ (US); Ashley M. Pennington, Washington, DC (US)

(73) Assignee: RUTGERS, THE STATE UNIVERSITY OF NEW JERSEY, New Brunswick, NJ (US)

(*) Notice: Subject to any disclaimer, the term of this patent is extended or adjusted under 35 U.S.C. 154(b) by 429 days.

(21) Appl. No.: 16/855,128

(22) Filed: Apr. 22, 2020

(65) Prior Publication Data

US 2020/0330963 A1 Oct. 22, 2020

Related U.S. Application Data

(60) Provisional application No. 62/836,805, filed on Apr. 22, 2019.

(51) Int. Cl.

| | |
|---|---|
| *B01J 23/52* | (2006.01) |
| *B01J 35/08* | (2006.01) |
| *B01J 35/02* | (2006.01) |
| *B01J 35/00* | (2006.01) |
| *B01J 21/06* | (2006.01) |
| *C01B 3/04* | (2006.01) |
| *B01J 37/02* | (2006.01) |
| *B01J 37/08* | (2006.01) |
| *B01J 37/04* | (2006.01) |

(52) U.S. Cl.
CPC ............ *B01J 23/52* (2013.01); *B01J 21/063* (2013.01); *B01J 35/004* (2013.01); *B01J 35/0033* (2013.01); *B01J 35/023* (2013.01); *B01J 35/08* (2013.01); *B01J 37/0219* (2013.01); *B01J 37/0221* (2013.01); *B01J 37/0225* (2013.01); *B01J 37/0228* (2013.01); *B01J 37/0244* (2013.01); *B01J 37/04* (2013.01); *B01J 37/086* (2013.01); *C01B 3/042* (2013.01)

(58) Field of Classification Search
CPC ...... B01J 23/52; B01J 21/063; B01J 35/0033; B01J 35/004; B01J 35/023; B01J 35/08; B01J 37/0219; B01J 37/0221; B01J 37/0225; B01J 37/0228; B01J 37/0244; B01J 37/04; B01J 37/086; B01J 35/0013; B01J 35/006; B01J 35/026; C01B 3/042; Y02E 60/36; Y02P 20/133
USPC ........................................................ 423/652
See application file for complete search history.

(56) References Cited

U.S. PATENT DOCUMENTS

| | | |
|---|---|---|
| 9,522,384 B2 | 12/2016 | Lu et al. |
| 2009/0162567 A1 | 6/2009 | Tseng et al. |
| 2010/0062032 A1 | 3/2010 | Sharma |
| 2018/0154345 A1 | 6/2018 | Dadheech et al. |

OTHER PUBLICATIONS

Golabiewska et al, The effect of gold shape and size on the properties and visible light-induced photoactivity of Au—TiO2, Applied Catalysis B: Environmental 196 (2016) 27-40). (Year: 2016).*

* cited by examiner

*Primary Examiner* — Taylor V Oh
(74) *Attorney, Agent, or Firm* — Fox Rothschild LLP

(57) ABSTRACT

The invention relates to a method of preparing titanium dioxide-coated nanostars. Titanium precursors are hydrolyzed into crystalline TiO$_2$ polymorphs at low temperatures, allowing the delicate morphology of the nanostars to be preserved while maintaining their desirable photocatalytic properties.

16 Claims, No Drawings

NEAR INFRARED PHOTOCATALYST BASED ON TIO$_2$-COATED GOLD NANOPARTICLES

CROSS REFERENCE TO RELATED APPLICATIONS

This application claims priority under 35 U.S.C. § 119(e) to U.S. Provisional Application Ser. No. 62/836,805, filed Apr. 22, 2019.

FIELD OF THE INVENTION

The invention relates to a new method of preparing TiO$_2$-coated nanostars, which exhibit a range of photocatalytic properties.

BACKGROUND

Photocatalysis technology is widely used in solar and renewable energy industries to generate energy from renewable sources such as sunlight. Photocatalysts which are stimulated by visible- and infrared light in addition to ultraviolet are attractive targets in the field of renewable energy. Within the solar spectrum, 4-5% is UV while visible light comprises approximately 40%. In conventional materials, the catalytic activity of titanium oxide is only stimulated by ultraviolet light (UV), and activity of comparable photocatalysts under broad light illumination conditions is equivalent to the activity under UV illumination. A need exists to develop a new material with enhanced catalytic capacity under visible or infrared light in addition to UV.

SUMMARY

This document discloses a new approach to the manufacturing of TiO$_2$-coated gold nanostars, which in comparison with conventional materials provides improved efficiency and output for use in photocatalytic systems. The TiO$_2$-coated gold nanostars find applications in solar and renewable energy industries and can be incorporated into various devices such as semiconductors and photocatalysis-related devices.

An aspect of the patent document provides a nanoparticle in the shape of a nanostar for photocatalysis. The nanoparticle includes a nanosphere, tips protruding from the nanosphere, and a coating comprising TiO$_2$. The coating is preferably uniform over the entire surface of the nanostar. Also provided are semiconductor or photocatalyis devices containing the nanoparticles described herein.

In some embodiments, the nanosphere and tips comprise a noble metal. In some embodiments, the nanosphere and tips comprise gold.

In some embodiments, the tips have a length ranging from about 15 to about 80 nm. In some embodiments, the ratio between the diameter of the nanosphere and the tip ranges from about 4:1 to about 1:1.

In some embodiments, the coating is substantially free from a metal dopant. In some embodiments, the TiO$_2$ is a crystalline polymorph. In some embodiments, the TiO$_2$ contains anatase crystals and/or rutile crystals.

Another aspect provides a method of coating nanoparticles. The method of manufacturing for titanium dioxide (TiO$_2$)-coated gold nanostars enables tunable amounts of crystalline titanium dioxide (TiO$_2$) to be grown on the nanostar surface utilizing a low-temperature, sol-gel approach. Titanium precursors are hydrolyzed into crystalline TiO$_2$ polymorphs at low temperatures, allowing the delicate morphology of the nanostars to be preserved while maintaining their desirable photocatalytic properties.

The method generally includes preparing a titanium dioxide sol-gel composition; coating nanoparticles with the sol-gel composition; and heating the coated nanoparticles to form TiO$_2$-coated nanoparticles. In some embodiments, anatase crystals of titanium dioxide are formed as a coating. In some embodiments, the coating further contains titanium dioxide rutile crystal. In some embodiments, the coating consists essentially of titanium dioxide anatase and rutile crystals. The composition is substantially free from a metal dopant. In some embodiments, the precursor of titanium dioxide is selected from titanium n-butoxide (n-C$_4$H$_9$O)$_4$Ti), titanium t-butoxide (t-C$_4$H$_9$O)$_3$Ti), titanium tetra-iso-butoxide (TTIB), titanium ethoxide, titanium chloride-aluminum chloride (TiCl$_3$.1/3AlCl$_3$), titanium (IV) chloride (TiCl$_4$), titanium (IV) isopropoxide (C$_3$H$_7$O)$_4$Ti), tetrakis(diethylamido)titanium(IV), tetrakis(dimethylamido)titanium(IV), and titanium-(triethano-laminato)isopropoxide.

The nanoparticles are generally in the form of nano stars. In some embodiments, the nanoparticles received a gold coating prior to being coated with titanium dioxide. In some embodiments, the heating step is controlled at a temperature of below about 100° C.

Another aspect of the patent document provides a method of catalyzing hydrogen production from water by illuminating the nanoparticle described herein in water with ultra violet light, visible light or infrared light.

In some embodiments, the nanoparticle is illuminated with visible light. In some embodiments, the nanoparticle is illuminated with infrared light. In some embodiments, the amount of the coated nanoparticle is so used that 2.5 μmol H$_2$ per mg of the nanoparticle is produced in 20 minutes.

In some embodiments, the TiO$_2$ is crystalline polymorphs. In some embodiments, the TiO$_2$ contains anatase crystals.

DETAILED DESCRIPTION

The newly developed synthesis method has the advantage of utilizing a sol-gel that hydrolyzes titanium precursors into crystalline TiO$_2$ polymorphs at relatively low temperatures for growth of crystalline TiO$_2$ on the surface of gold nanoparticle, allowing the nanoparticle's shape to be preserved while conferring the desired photocatalytic properties. The characteristic shape of gold nanoparticles makes them ideally suited for 'hot' electron generation within semiconductors, making them attractive platforms for the synthesis of photocatalysts. However, they are also highly temperature-sensitive. The low-temperature TiO$_2$ coating manufacturing method described herein preserves the nanoparticle morphology while depositing a layer of crystalline titanium oxide on their surface.

While the following text may reference or exemplify specific elements of a method or a product of the method, it is not intended to limit the scope of the invention to such particular reference or examples. Various modifications may be made by those skilled in the art, in view of practical and economic considerations, such as temperature and time of the heating step.

The articles "a" and "an" as used herein refers to "one or more" or "at least one," unless otherwise indicated. That is, reference to any element or component of the present invention by the indefinite article "a" or "an" does not exclude the possibility that more than one of the elements or components is present.

The term "about" as used herein refers to the referenced numeric indication plus or minus 10% of that referenced numeric indication.

The term "nanoparticle" as used herein generally refers to a particle that exhibits one or more properties not normally associated with a corresponding bulk material (e.g., quantum optical effects, etc.). The term also generally refers to materials having at least two dimensions that do not exceed about 1000 nm. And, in various embodiments described herein, these dimensions are even smaller.

The growth of a conformal layer of crystalline $TiO_2$ on gold nano stars is achieved by a simple hydrothermal route preserving the large aspect ratio of the protruding spikes of the nanostar and enabled the photocatalytic evolution of hydrogen under NIR illumination. The delicate structure of the underlying nano stars is otherwise extremely sensitive to atom migration. It has been revealed that the crystal plane of anatase $TiO_2$ grows epitaxially on the surface of gold, and $TiO_2$ layer thickness and crystallinity can be controlled by varying synthesis conditions. $TiO_2$-coated gold nano stars (AuNS@$TiO_2$) displayed significantly enhanced photocatalytic activity under visible-NIR illumination compared to reported $TiO_2$-coated gold nanoparticles and commercially available $TiO_2$ nanoparticles. The high photocatalytic activity is attributed to effective hot electron generation via absorption of radiation via localized surface plasmon resonance modes of the spikes and further injection to the conduction band of the $TiO_2$ shell across the gold nanoparticle-$TiO_2$ interface.

The method generally includes preparing a titanium dioxide sol-gel composition; coating nanoparticles with the sol-gel composition; and heating the coated nanoparticles to form $TiO_2$-coated nanoparticles.

The titanium dioxide sol-gel composition is a chemical solution or suspension containing a titanium dioxide precursor which forms a polymerized titanium dioxide coating when the solvent is removed, such as by heating or any other means. The precursors for titanium dioxide ($TiO_2$) include, but are not limited to, titanium n-butoxide (n-$C_4H_9O)_4Ti$), titanium t-butoxide (t-$C_4H_9O)_3Ti$), titanium tetra-iso-butoxide (TTIB), titanium ethoxide, titanium chloride-aluminum chloride ($TiCl_3.1/3AlCl_3$), titanium (IV) chloride ($TiCl_4$), titanium (IV) isopropoxide ($C_3H_7O)_4Ti$), tetrakis(diethylamido)titanium(IV), and tetrakis(dimethylamido)titanium (IV). The composition may contain water, an organic solvent, or any mixture thereof. In some embodiments, the composition does not contain a dopant such as silver, silver oxide, tungsten, tungsten oxide, gold, and tin oxide. In some embodiments, the composition consists essentially of titanium dioxide precursor and the solvent so that more than 90%, more than 95% or more than 99% of the resulting coating is crystalline titanium dioxide and the coated nanoparticles are capable to catalyze the production of 2.5 μmol $H_2$ per mg of the nanoparticles in 20 minutes.

The nanoparticles may be coated with the sol-gel composition by various means. Examples include spin-coating the sol-gel composition on the nanoparticles, spray-coating the sol-gel composition on the nanoparticles, dip-coating the nanoparticles with the sol-gel composition, and any other technique known to those of skill in the art.

Titanium precursors are hydrolyzed into crystalline $TiO_2$ polymorphs at low temperatures, allowing the delicate morphology of the nanostars to be preserved while maintaining their desirable photocatalytic properties. In some embodiments, the temperature is controlled at below about 500° C., below about 450° C., below about 400° C., below about 350° C., below about 300° C., below about 250° C., below about 200° C., below about 150° C., below about 100° C., or below about 50° C. In some embodiments, the temperature ranges from about 40° C. to about 150° C., from about 40° C. to about 100° C., from about 50° C. to about 10° C., from about 60° C. to about 120° C., or from about 60° C. to about 100° C. The time of heating can be adjusted in view of the specific heating temperature to achieve the desired properties for the coated nanoparticles.

The thickness of the $TiO_2$ coating may range from, for example, about 1 nm to about 30 nm, all subunits included. Exemplary embodiments of the thickness of the coating include about 1, about 2, about 3, about 4, about 5, about 10, and about 20 nm. In some embodiments, the nanoparticle is made of a noble metal or has a coating of noble metal beneath the $TiO_2$ coating. Noble metals are defined as including, for example, metals such as gold, silver, or copper. In some embodiments, the nanoparticles include at least a noble metal such as aluminum, copper, silver, platinum or gold. In some embodiments, the nanoparticles include alloys such as copper/silver/gold alloy (e.g., copper-silver alloy, copper-gold alloy, silver-gold alloy, copper-silver-gold alloy). In some embodiments, the nanoparticles include a core of, for example, silica, platinum, or other metal particles, onto which a layer is deposited, e.g., layers of Cu, Ag, or Au. In some embodiments, the nanoparticles include gold. In some embodiments, the nanoparticles include copper. In some embodiments, the nanoparticles include silver. In some embodiments, the nanoparticles include platinum.

The nanoparticles generally have a sphere shape (nanospheres) with protrusions on the surface thereof. The shapes of these nanoparticles can be obtained by various nanoparticle synthesis methods known in the art without undue experimentation. For example, gold nano stars with different shapes or protrusions can be synthesized by changing the seed volume and concentration of $HAuCl_4$. In some embodiments, the nanoparticles have an effective average diameter of between about 50 to about 100 nm, between about 50 to about 200 nm, or between about 50 to about 150 nm before being coated with $TiO_2$.

The sharpness of the tips or protrusions on the surface in some embodiments can be defined by the radius of curvature at the tip end. In some embodiments, the radius of curvature at the tip ranges from about 1 nm to about 50 nm. Non-limiting examples of the radius of curvature for the tip include about 0.5, 1, 2, 3, 4, 5, 6, 7, 8, 9, 10, 15, 20, 25, 30, 35, 40, 45, and 50 nm. Because the tips may or may not be in the shape of a perfect cone, a single tip likely has multiple radii of curvature at the tip end.

The length of the tips ranges from about 1 nm to about 200 nm. Non-limiting examples of tip length include about 1, 2, 3, 4, 5, 6, 7, 8, 9, 10, 15, 20, 25, 30, 35, 40, 45, 50, 55, 60, 65, 70, 75, 80, 85, 90, 95, 100, 110, 120, 130, 140, 150, 160, 170, 180, 190 and 200 nm. In some embodiments, the tip length ranges from about 80 to about 180, from about 100 to about 160, from about 100 to about 160, from about 120 to about 160, from about 130 to about 150, or from about 120 to about 140 nm.

The overall structure of the nanoparticle can be further defined by the ratio between the diameter of the nano sphere (not including the tip or protrusion on the surface) and the length of the protrusion or tip. Generally, the ratio ranges from about 100:5 to about 20:100, all subunits and sub-ratios included. Non-limiting examples of the ratio include about 10:1, 9:1, 8:1, 7:1, 6:1, 5:1, 4:1, 3:1, 2:1, 1:1, 1:2, 1:3, 1:4, and 1:5. In some embodiments, the ratio between the diameter of the star and the length of the tip ranges from about 10:1 to about 2:1, from about 8:1 to about 4:1, or from about 7:1 to about 5:1.

Another aspect of the document provides a $TiO_2$-coated nanoparticles prepared according to the method described herein. Various characteristics of the nanoparticles in the form nanostars are as descried above.

$TiO_2$-coated gold nanostars generated using this manufacturing method exhibit increased hydrogen production from water compared to standard $TiO_2$-coated nanoparticles and uncoated nanostars. In exemplary embodiments, $TiO_2$-coated nanoparticles produced according to the present invention are capable of evolving greater than 2.5 µmol $H_2$/mg of catalyst in 20 minutes. In comparable materials, the catalytic activity of titanium oxide is only stimulated by ultraviolet light (UV) and activity of comparable photocatalysts under broad light illumination conditions is equivalent to the activity under UV illumination. The enhanced efficiency of the newly developed material is attributed to its ability to catalyze hydrogen production in the presence of visible and infrared light in addition to UV.

$TiO_2$-coated gold nanoparticles synthesized using the newly developed method have been demonstrated to generate hydrogen from water four times more efficiently than commercially available $TiO_2$ nanoparticles or $TiO_2$-coated gold nanoparticles. While traditional catalysts are only stimulated by ultraviolet light (UV), the enhanced efficiency of photocatalysts generated using the newly disclosed method can be attributed to the ability to catalyze water splitting in the presence of visible and infrared light in addition to UV.

EXAMPLE

Materials. Gold(III) chloride trihydrate ($HAuCl4.3H2O$), silver nitrate ($AgNO3$; 99.995%), L(+)-ascorbic acid, titanium-(triethanolaminato) isopropoxide (N((CH2)2O)3TiOCH(CH3)2, TTEAIP) in isopropanol (80%), titanium isopropoxide (Ti(OCH(CH3)2)4, TTIP), glacial acetic acid, isopropanol, and methanol were purchased from Sigma-Aldrich. HCl (12 N) was purchased from Fisher Chemical. Anatase was purchased from Acros Organics and P25 was supplied by Evonik. All of these materials were used without further purification. Ultrapure MilliQ water was used in all syntheses. All glassware was cleaned with aqua regia before each synthesis.

Instrument. Absorption spectra were collected using an S. I. Photonics Fiber Optic CCD Array UV-Vis Spectrophotometer using a quartz cuvette with 1-cm path. The nanoparticle morphology was determined using a Topcon 002B transmission electron micro-scope depositing the nanoparticle suspension on Ted Pella PELCO TEM grids.

AuNS@$TiO_2$ Synthesis

Synthesis of Surfactant-Free Gold Nanostars Surfactant-free gold nanostars were synthesized following a previously reported method (J. Phys. Chem. C 2016, 120, 37, 20749-20758). Citrate-capped seeds (12 nm) were prepared according to the modified Turkevich method (J. Phys. Chem. B 2006, 110, 32, 15700-15707). The absorbance of the as-synthesized citrate-capped seeds was 0.6. The solution was concentrated eight times via centrifugation before use. Nanostars were synthesized by simultaneous addition of 2 mL of 3 mM $AgNO_3$ and 1 mL of 0.1 M ascorbic acid to a solution containing 2 mL of 0.025 M $HAuCl_4$, 48 mL of milliQ water, 40 µL of the citrate-capped gold seed solution, and 200 µL of 1 N HCl solution. An immediate, intense bluish-green color appeared after simultaneous addition of $AgNO_3$ and ascorbic acid. The solution was stirred for 7 min.

Synthesis of AuNS@$TiO_2$ from TTEAIP Precursor.

AuNS@$TiO_2$ was synthesized by following a modified method for $TiO_2$-coated gold nanorod synthesis according to the procedure described in the literature (Nanoscale, 2013, 5, 4236-4241). 40 µL of TTEAIP in isopropanol (80%) solution was added to 50 mL of gold nanostar suspension and the mixture was stirred for 24 hr. The suspension was then washed with 1:1 MilliQ water and ethanol mixture twice, redispersed in 10 mL of acetone, and dried to produce a powder.

Synthesis of AuNS@$TiO_2$ from TTIP Precursor.

AuNS@$TiO_2$ was synthesized following an acetic acid-induced sol-gel $TiO_2$ nanoparticle synthesis method (J. Mater. Chem. A. 2017, 5, 12236-12242). 300 mL of gold nano stars were centrifuged at 5,000 3 g for 15 min and dispersed in 60 mL of isopropanol. 6 mL of acetic acid and 250 µL of TTIP were added to the solution and stirred for 30 min, followed by addition of 250 µL of MilliQ water. The resulting solution was stirred for 12 hr at room temperature and then heated at either 62° C. or 70° C. to crystallize the $TiO_2$ shell. The solution was washed with 1:1 MilliQ water and ethanol mixture twice and then dried to produce a powder.

Photocatalytic Water Reduction.

Photocatalytic activity of the samples was tested via batch-phase water reduction with methanol as a sacrificial agent, similar to the procedure reported by Wu et al (J. Am. Chem. Soc. 2016, 138, 1114-1117). The reaction was carried out in a 25-mL glass reactor filled with 10 mL of 20% methanol in MilliQ water. Fresh AuNS@$TiO_2$ catalyst (1.5 mg) was dispersed in 10 mL of reaction solution via sonication for 5 min. For control experiments using anatase and P25, 0.5 mg of $TiO_2$, or roughly the same mass of $TiO_2$ alone in the AuNS@TiO2 samples, were used. The reactor was illuminated by a 150-W xenon ozone-free arc lamp (Newport) with an approximate flux of 3,000 and brightness of 150 cd $mm^{-2}$ using 20 V and 7.5 A of power. Four illumination conditions were investigated: dark (no illumination), UV illumination (280-400 nm), visible illumination (420-630 nm), and broad-spectrum illumination (200-1,500+nm). UV and visible cutoffs were achieved via dichroic mirror beamturner assembly and glass bandpass filter. To ensure that illumination did not affect the reaction temperature, we kept the reactor at 40° C. with a heated oil bath under all illumination conditions. Magnetic stirring was employed to ensure that the AuNS@TiO2 remained suspended in the reaction media. The hydrogen production rate was monitored at 20 min for each condition by injecting a 300-mL aliquot of the reactor headspace gas into the thermal conductivity detector of a GC (Agilent 7890B). Hydrogen production is reported as per gram of catalyst for all samples.

It will be appreciated by persons skilled in the art that the present invention is not limited to what has been particularly shown and described. Rather, the scope of the present invention is defined by the claims which follow. It should further be understood that the above description is only representative of illustrative examples of embodiments. The description has not attempted to exhaustively enumerate all possible variations. The alternate embodiments may not have been presented for a specific portion of the invention, and may result from a different combination of described portions, or that other un-described alternate embodiments may be available for a portion, is not to be considered a disclaimer of those alternate embodiments. It will be appreciated that many of those un-described embodiments are within the literal scope of the following claims, and others are equivalent.

The invention claimed is:

1. A nanostar for photocatalysis, comprising a nanosphere, tips protruding from the nanosphere, and a coating comprising TiO2;
wherein the TiO2 coating encloses the nanosphere and the tips protruding from the nanosphere.

2. The nanostar of claim 1, wherein the nanosphere and the tips comprise a noble metal.

3. The nanostar of claim 1, wherein the nanosphere and the tips comprise gold.

4. The nanostar of claim 1, wherein the tips have a length ranging from about 50 to about 180 nm.

5. The nanostar of claim 1, wherein the ratio between the diameter of the nanosphere and the tip ranges from about 4:1 to about 8:1.

6. The nanostar of claim 1, wherein the coating is substantially free from a metal dopant and the thickness of the coating ranges from about 20 to about 30 nm.

7. The nanostar of claim 1, wherein the coating comprises TiO2 crystalline polymorphs.

8. The nanostar of claim 1, wherein the coating comprises TiO2 anatase crystal.

9. The nanostar of claim 8, wherein the coating further comprises TiO2 rutile crystal.

10. A method for preparing the nanostar of claim 1, comprising
(a) providing a titanium dioxide sol-gel composition comprising titanium dioxide or precursor thereof;
(b) admixing nanostars with the sol-gel composition to form a mixture; and
(c) heating the mixture at a temperature of below about 150° C. to form TiO2-coated nanostars.

11. The method of claim 10, wherein anatase crystals of TiO2 are formed as a coating of the nanostars at step (c).

12. The method of claim 11, wherein step (c) also forms TiO2 rutile crystal in the coating.

13. The method of claim 10, wherein the composition is substantially free from a metal dopant.

14. The method of claim 10, wherein the precursor of titanium dioxide is selected from the group consisting of titanium n-butoxide (n-C4H9O)4Ti), titanium t-butoxide (t-C4H9O)3Ti), titanium tetra-iso-butoxide (TTIB), titanium ethoxide, titanium chloride-aluminum chloride (TiCl3.1/3AlCl3), titanium (IV) chloride (TiCl4), titanium (IV) isopropoxide (C3H7O)4Ti), tetrakis(diethylamido)titanium(IV), and tetrakis(dimethyl-amido)titanium(IV).

15. The method of claim 10, wherein the nanostars comprise a gold coating prior to step (a).

16. The method of claim 10, wherein step (c) is controlled at a temperature of below about 100° C.

* * * * *